(12) United States Patent
Schneider (10) Patent No.: US 11,429,706 B2
(45) Date of Patent: Aug. 30, 2022

(54) METHOD FOR AUTHENTICATING A USER OF A MOTOR VEHICLE, AUTOMOTIVE, AND COMPUTER PROGRAM

(71) Applicant: VOLKSWAGEN AG, Wolfsburg (DE)

(72) Inventor: Immo Schneider, Braunschweig (DE)

(73) Assignee: VOLKSWAGEN AG

( * ) Notice: Subject to any disclaimer, the term of this patent is extended or adjusted under 35 U.S.C. 154(b) by 0 days.

(21) Appl. No.: 14/940,874

(22) Filed: Nov. 13, 2015

(65) Prior Publication Data

US 2016/0147990 A1  May 26, 2016

(30) Foreign Application Priority Data

Nov. 20, 2014 (DE) ...................... 10 2014 223 663.0

(51) Int. Cl.
| | | |
|---|---|---|
| *G06F 21/36* | (2013.01) | |
| *H04W 12/06* | (2021.01) | |
| *G06F 21/34* | (2013.01) | |
| *H04L 9/40* | (2022.01) | |
| *G06F 21/44* | (2013.01) | |
| *H04W 12/77* | (2021.01) | |

(52) U.S. Cl.
CPC .............. *G06F 21/36* (2013.01); *G06F 21/34* (2013.01); *G06F 21/44* (2013.01); *H04L 63/0853* (2013.01); *H04L 63/0876* (2013.01); *H04W 12/06* (2013.01); *H04W 12/77* (2021.01)

(58) Field of Classification Search
CPC . H04L 63/08; H04L 63/0853; H04L 63/0876; H04L 63/10; H04L 2463/082; H04W 12/06; G06F 21/30; G06F 21/31; G06F 21/34; G06F 21/36; G06F 21/44
See application file for complete search history.

(56) References Cited

U.S. PATENT DOCUMENTS

| | | | | |
|---|---|---|---|---|
| 8,292,168 | B2 * | 10/2012 | Vilnai ...................... | B67D 7/34 |
| | | | | 235/381 |
| 8,583,317 | B2 * | 11/2013 | Nishida ................. | H04L 63/105 |
| | | | | 701/31.4 |
| 8,688,510 | B2 * | 4/2014 | Namdar ............... | G06Q 20/403 |
| | | | | 705/13 |
| 8,825,354 | B2 * | 9/2014 | Horita ..................... | B60Q 9/00 |
| | | | | 701/118 |
| 8,912,924 | B2 * | 12/2014 | Scofield ................. | G07B 15/04 |
| | | | | 340/932.2 |
| 9,120,452 | B2 * | 9/2015 | Nishimoto .......... | B60R 25/1001 |
| 9,302,612 | B2 * | 4/2016 | Tatara ..................... | G06F 21/10 |
| 9,471,697 | B2 * | 10/2016 | Lortz .................... | H04W 4/008 |
| 9,563,998 | B2 * | 2/2017 | Hoyos ................ | G07C 9/00563 |
| 9,792,632 | B2 * | 10/2017 | Betancourt ............ | G06Q 10/02 |
| 9,865,110 | B2 * | 1/2018 | Link, II ................ | H04L 63/123 |

(Continued)

FOREIGN PATENT DOCUMENTS

| | | |
|---|---|---|
| CN | 101855861 A | 10/2010 |
| CN | 102196020 A | 9/2011 |

(Continued)

*Primary Examiner* — Zachary A. Davis (74) *Attorney, Agent, or Firm* — Barnes & Thornburg, LLP (57) ABSTRACT

Systems, methods, and devices for authenticating an authorization of a user of a motor vehicle can include sending a request signal for an authentication code and providing the authentication code via the computer to a device included in the motor vehicle.

15 Claims, 5 Drawing Sheets

(56) References Cited

U.S. PATENT DOCUMENTS

| | | | |
|---|---|---|---|
| 9,870,656 B2* | 1/2018 | Katta | G07C 5/085 |
| 10,318,963 B1* | 6/2019 | Prasad | G06Q 30/018 |
| 10,421,435 B2* | 9/2019 | Pophale | B60R 25/24 |
| 10,679,429 B2* | 6/2020 | Fustes | G06Q 20/3223 |
| 2012/0313796 A1 | 12/2012 | Lee et al. | |
| 2013/0167208 A1 | 6/2013 | Shi | |
| 2013/0293349 A1* | 11/2013 | Tempi | G07C 9/00182 |
| | | | 340/5.61 |
| 2014/0033286 A1 | 1/2014 | Zhang | |
| 2014/0085110 A1* | 3/2014 | Scofield | G07B 15/04 |
| | | | 340/932.2 |
| 2014/0187149 A1* | 7/2014 | Lortz | H04W 4/008 |
| | | | 455/41.1 |
| 2015/0325058 A1* | 11/2015 | Lambrinos | G07B 15/04 |
| | | | 705/13 |

FOREIGN PATENT DOCUMENTS

| | | |
|---|---|---|
| DE | 10 2012 012 565 A1 | 12/2013 |
| DE | 102012219335 A1 | 4/2014 |
| DE | 10 2013 003 044 A1 | 8/2014 |
| EP | 2 211 449 A2 | 7/2010 |
| EP | 2211499 A1 | 7/2010 |
| JP | 2007034765 A | 2/2007 |
| KR | 20040045060 A | 6/2004 |
| KR | 20100021943 A | 2/2010 |
| WO | 2013189510 A1 | 12/2013 |

* cited by examiner

METHOD FOR AUTHENTICATING A USER OF A MOTOR VEHICLE, AUTOMOTIVE, AND COMPUTER PROGRAM

PRIORITY CLAIM

This patent application claims priority to German Patent Application No. 10 2014 223 663.0, filed 20 Nov. 2014, the disclosure of which is incorporated herein by reference in its entirety.

SUMMARY

The exemplary embodiments are in the field of authenticating an authorization of a user of a motor vehicle.

BACKGROUND

Networking systems for motor vehicles, for example, Connected Car or Car-Net, are often used in motor vehicles, for example, to provide a user with easier access to traffic information, homing guidance, or retrieval of vehicle information or trip data from outside the vehicle. However, a registration process for users may be complex and error-prone, as it may be necessary to read various security codes and to manually re-enter them elsewhere. Furthermore, during the registration process, applications may be used which include additional physical elements, for example, key rings or letters containing scratchcard codes, Postident, or a transfer of sums in cent amounts. In some cases, such applications may also be prone to errors, for example, transfer errors. Such complexity, or failure experienced by the user, may result in an unnecessary loss of customers or entail support expenses due to a customer service such as a garage or a call center. In addition, as a result, acceptance of a product in the market by users may be adversely affected. Furthermore, this may also affect registration processes for other applications in addition to motor vehicles.

BRIEF DESCRIPTION OF THE DRAWINGS

Several exemplary embodiments will be described and explained in greater detail below with reference to the attached figures.

DETAILED DESCRIPTION OF THE DISCLOSED EMBODIMENTS

Exemplary embodiments relate to a method for authenticating an authorization of a user of a motor vehicle. The method includes sending a request signal for an authentication code to a computer. The method also includes providing the authentication code via the computer to an onboard device included in the motor vehicle. As a result, an authentication of a user may be carried out directly from the vehicle, and use of a customer portal, for example, via a personal computer (PC) may be omitted.

In some exemplary embodiments, the request signal also includes a piece of information about an identity of the motor vehicle. As a result, an automatic association of a particular motor vehicle with a particular user and possibly a particular application program (app) of the user may be made possible.

In some exemplary embodiments, the sending of the request signal is carried out on a wireless communication channel.

In some exemplary embodiments, the sending of the request signal is carried out via the onboard device included in the motor vehicle. This may make it possible for the user to request the authentication code from the vehicle.

In some exemplary embodiments, the method furthermore includes receiving a trigger signal via the onboard device. In this case, the sending of the request signal is carried out in response to the trigger signal. This may make it possible for the user to request the authentication code even if the user is outside the vehicle.

In some exemplary embodiments, the method furthermore includes transferring the authentication code to the computer via a mobile device. This may provide a higher level of security during authentication if needed, and may furthermore provide an option of recording the authentication code from a display device by the onboard device with the aid of a sensor of the mobile device.

In some exemplary embodiments, the method furthermore includes recording the authentication code from a display device via the mobile device. In this case, the display device is linked to the onboard device. This may facilitate transferring the authentication code for the user, since reading and manual entry may be omitted.

In some exemplary embodiments, the method furthermore includes displaying the authentication code as a two-dimensional matrix code via the display device. This may allow an inclusion of known encoding methods.

In addition, some exemplary embodiments relate to a method for associating an identity of a user with an identity of a motor vehicle. The method includes sending a request signal for an authorization code to a computer. In this case, the request signal also includes a piece of information about an identity of the motor vehicle. The method also includes providing the authorization code via the computer to an onboard device included in the motor vehicle. In addition, the method includes displaying the authorization code as a two-dimensional matrix code via a display device included in the onboard device. The method furthermore includes recording the authorization code from a display device via a mobile device. Furthermore, the method includes transferring the authorization code and a piece of identification information to the computer via the mobile device. In addition, the method includes associating the authorization code and the piece of information about the identity of the motor vehicle with an identity of the user previously stored by the computer, based on the piece of identification information. The method may enable an identification of a primary user of a vehicle with the aid of an application (app) running on the mobile device. The method may also be used for a simplified registration of a user for a motor vehicle. Furthermore, the method may enable an optical exchange of data.

Exemplary embodiments relate to a motor vehicle. The motor vehicle includes an onboard device. The onboard device is designed to send a request signal for an authentication code to a computer and to receive the authentication code from the computer. As a result, complexity for the user may be reduced during a registration process.

Some exemplary embodiments also relate to a system. The system includes an aforementioned motor vehicle and a computer. The computer is designed to receive a request signal for an authentication code. The request signal also includes a piece of information about an identity of the motor vehicle. In addition, the computer is designed to provide the authentication code to the onboard device of the motor vehicle in response to the request signal. As a result, an automation of data links may be made possible if needed, thereby making it possible to reduce effort both on the part of the user and on the part of a provider, such as a service provider.

In addition, additional exemplary embodiments also provide a program or computer program including program code for carrying out at least one of the aforementioned methods, if the program code is executed on a computer, a processor, or a programmable hardware component, for example, an application-specific integrated circuit (ASIC).

Various exemplary embodiments will now be described in greater detail with reference to the attached drawings, in which several exemplary embodiments are depicted. In the figures, the thickness dimensions of lines, layers, and/or regions may be depicted in an exaggerated manner for the sake of clarity.

In the following description of the attached figures, which show exemplary embodiments, identical reference numerals denote identical or comparable components. Furthermore, summary reference numerals are used for components and objects which occur multiple times in at least one exemplary embodiment or in at least one drawing, but are described jointly with respect to one or multiple features. Components or objects which are described having identical or summary reference numerals may be designed identically, but also differently as appropriate, with respect to individual features, multiple features, or all features, for example, their dimensions, unless otherwise evident explicitly or implicitly from the description.

Although exemplary embodiments may be modified and altered in different ways, exemplary embodiments are illustrated as examples in the figures and will be described herein in detail. However, it should be clarified that there is no intention to limit exemplary embodiments to the respective disclosed forms; rather, exemplary embodiments are to cover all functional and/or structural modifications, equivalents, and alternatives which lie within the scope of the disclosed embodiments. Identical reference signs denote identical or similar elements throughout the description of the figures.

It is to be noted that an element which is described as being "connected" or "linked" to another element may be directly connected or linked to the other element, or that intermediate elements may be present. On the other hand, if an element is described as being "directly connected" or "directly linked" to another element, no intermediate elements are present. Other terms which are used to describe the relationship between elements should be interpreted in a similar manner (for example, "between" versus "directly between", "adjacent" versus "directly adjacent", etc.).

The terminology which is used herein serves only to describe particular exemplary embodiments and is not intended to limit the exemplary embodiments. As used herein, the singular forms "a", "an" and "the" are intended to include the plural forms as well, unless the context clearly indicates otherwise. Furthermore, it is to be understood that the terms such as "contains", "containing", "has", and/or "having", "includes", and/or "including", when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as ascribed to them by persons having ordinary skill in the art, in the field to which these exemplary embodiments belong. It is to be understood that expressions such as those defined in commonly used dictionaries are to be interpreted as having the meaning which is consistent with their meaning in the context of the relevant technology, and are not to be interpreted in an idealized or overly formal sense unless otherwise expressly defined herein.

Figure 1:
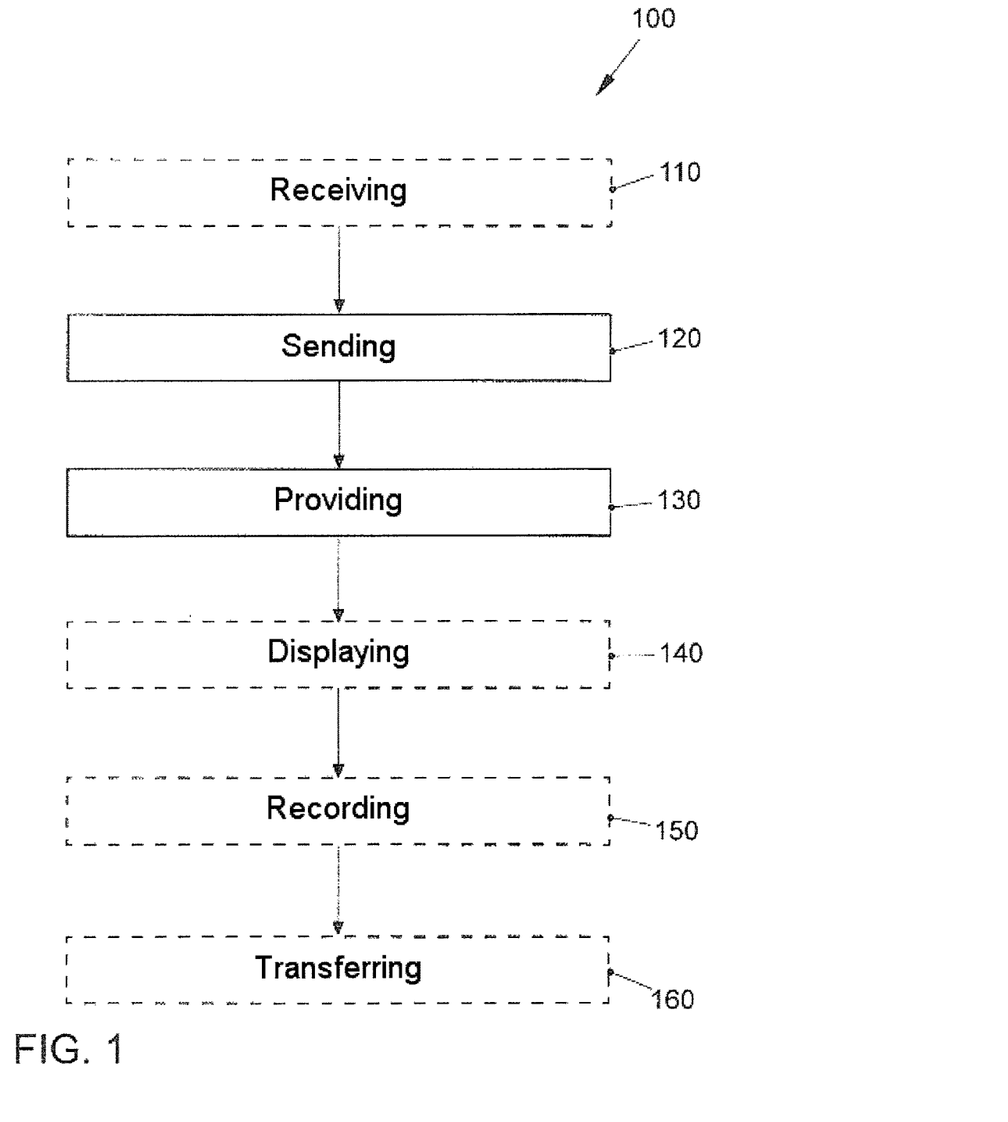
FIG. 1 shows a flow chart of a method for authenticating an authorization of a user of a motor vehicle according to at least one exemplary embodiment.

FIG. 1 shows a flow chart for a method 100 for authenticating an authorization of a user of a motor vehicle, according to at least one exemplary embodiment. The method 100 includes sending 120 a request signal for an authentication code to a computer. The method 100 also includes providing 130 the authentication code via the computer to an onboard device included in the motor vehicle. In this case, a motor vehicle may be a ground vehicle such as a passenger vehicle or truck, or in the broader sense, also watercraft or aircraft. According to various exemplary embodiments, the sending 120 of the request signal may be carried out in a wireless or wired manner. The request signal may, for example, be generated via an input by the user. The authentication code may, for example, include a transaction authentication number (TAN), and may be transferred via an encrypted connection. The computer may, for example, include a server or central computer which is accessible via the Internet, which includes a database containing data for a plurality of users and vehicles. The onboard device may, for example, be a driver assistance system, and include an internal control unit which is integrated into the vehicle. This may cause the authentication code to be provided only in the vehicle, and consequently, a presence of the user in the vehicle may be required for further use. As a result, potential security from possible data misuse or unauthorized access may be increased.

The method 100 may be used for a sale of mobile online services in which a networking of vehicles takes place. These may, for example, be digital services for an agreed period in each case. For this purpose, a contract may be concluded previously between a primary user of the service (customer) and a provider or service provider. For using the mobile online services, for example, a mobile device, such as a smartphone or tablet including an application (app) for exchanging data between a vehicle and an additional device (for example, an additional vehicle, a stationary or mobile computer), may be used.

The method 100 may be used for a registration process, during the course of which data about the person of the primary user, an identification feature (for example, serial number) of the app for exchanging data between the vehicle and an additional device, and an identifier of a vehicle to which the service relates, are linked. In at least one exemplary embodiment, the request signal includes a piece of information about an identity of the vehicle.

According to various exemplary embodiments, multiple paths are available for the sending 120 of the request signal, which are described in greater detail below. In at least one exemplary embodiment, the sending 120 is carried out by the onboard device which is included in the vehicle.

Alternatively, the user may manually enter a vehicle identification number (YIN) into the app. The app may transfer the VIN to the computer and request the authentication code, for example, the TAN. Alternatively, the user may manually enter the VIN into a portal provided by the computer and request the TAN. Alternatively, the user may actuate a pushbutton associated with the onboard device in the vehicle, for example, the internal control unit, and thereby switch on an additional switch, for example, a terminal. The internal control unit may also be designed to detect this operation sequence, and to transfer the VIN to the computer and request the TAN. In this case, the YIN is included in the request signal for the TAN. Alternatively, the request for the TAN may be transmitted to the computer via a call center agent. In this case, the YIN of the internal control unit may be automatically transferred to the computer via the call center.

In addition, the method 100 may include optional steps which are depicted in FIG. 1 as dashed blocks. In at least one exemplary embodiment, the method 100 optionally includes receiving 110 a trigger signal via the onboard device, as shown in FIG. 1. In this case, the sending of the request signal is carried out in response to the trigger signal. In other words, the app transmits the request signal in the vehicle wirelessly to the internal control unit (for example, via WIFI, Bluetooth, NFC). The internal control unit may transfer the VIN to the computer and request the TAN. Alternatively, the user may trigger the request in a menu of a computer installed in the vehicle including a display and operating unit, for example, a radio navigation system or a modular infotainment platform (MIP). The MIP may route the request to the internal control unit. In response, the internal control unit may transfer the VIN to the computer and request the TAN.

In response to the sending 120 of the request signal, the authentication code is transmitted from the computer to the vehicle with the corresponding VIN. In some exemplary embodiments, the method 100 optionally includes displaying 140 the authentication code as a two-dimensional matrix code via a display device. In this case, the display device is linked to the onboard device. The two-dimensional matrix code may, for example, be a quick response code (QR code). In some exemplary embodiments, the method 100 optionally includes recording 150 the authentication code from a display device by the mobile device. For this purpose, the mobile device may be an optical sensor, for example, a camera, infrared sensor, or scanner. In some exemplary embodiments, the method 100 optionally includes transferring 160 the authentication code to the computer via the mobile device.

Figure 2:
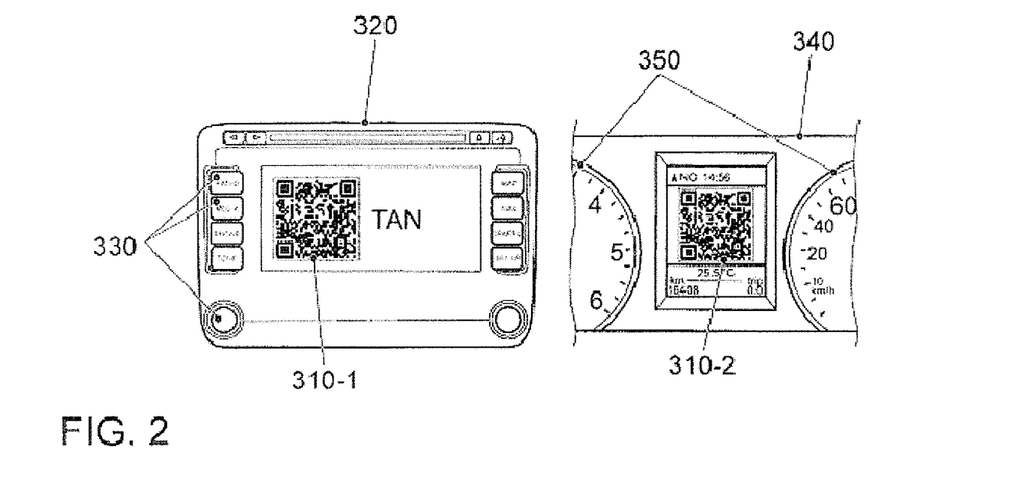
FIG. 2 shows a representation of an authorization code for a user inside a motor vehicle according to at least one exemplary embodiment.

In other words, the method 100 described in FIG. 1 may, for example, use a smartphone of the user for the registration process. For this purpose, a camera included in the smartphone and the aforementioned app may be used in connection with matrix codes which may also be displayed in the vehicle. FIG. 2 illustrates the displaying of a matrix code 310, which is depicted here as a QR code, on a display area which is inside a vehicle and which is linked to the onboard device. The display area may, for example, be included in a driver assistance system 320 and linked to additional operating elements 330, for example, pushbuttons or rotary switches. Alternatively, the display area may also be situated on a dashboard 340 including additional instruments 350 (for example, a speedometer or tachometer).

Figure 3:
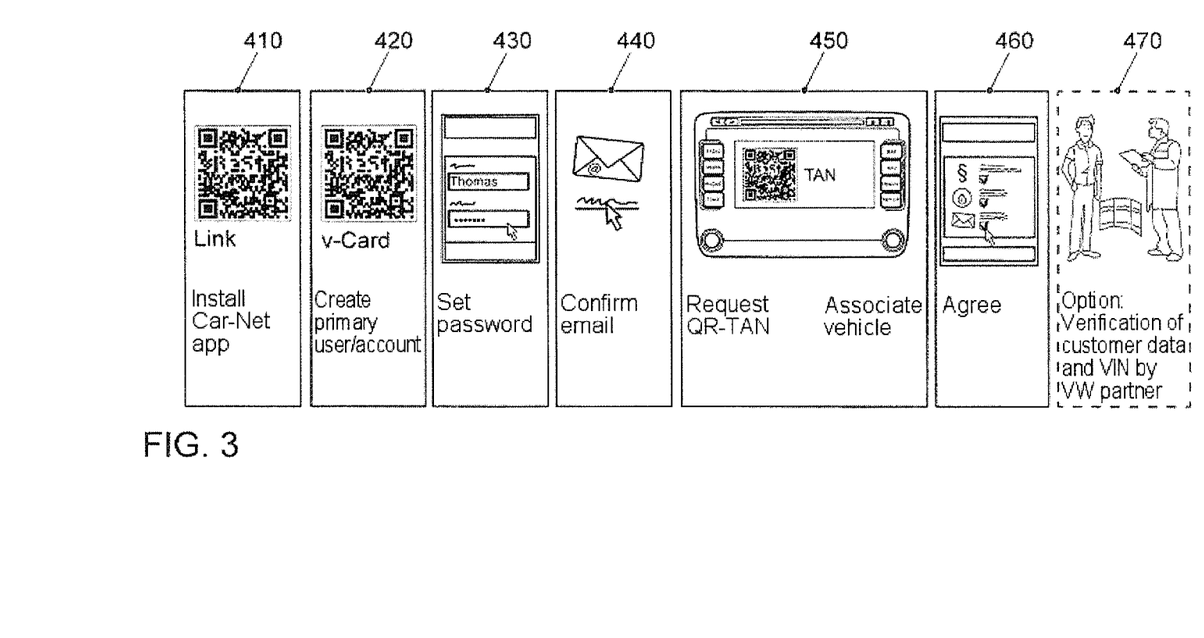
FIG. 3 shows an illustration of operating steps from the point of view of a user with the scope of at least one of the exemplary methods.

FIG. 3 shows an illustration of operating steps from the point of view of the user within the scope of the method 100. First, an installation 410 of an app is carried out for exchanging information in a vehicle network. For this purpose, a link may exist, for example, as a QR code in a log book or a brochure associated with the vehicle. The QR code may be detected by a program running on a mobile device as a link to the app in an app store. The mobile device is thus able to install the app. The app may receive an unambiguous identification number (app ID) from a computer or data center of the provider. A manual input of the link or a search for the app in the app store may thus be omitted.

Creation 420 of a user account follows. The user may be a primary user of the vehicle. The app may be designed to record customer data such as the name or address from internal data of the mobile device or from a QR code (for example, an electronic business card or vCard). The user may thereby receive a registration ID number. Setting 430 an individual password may follow. The user is able to carry out a confirmation 440 of his/her email address with the aid of a double registration process (double opt-in). The email address of the user may thereby be verified, which may increase operating security. In addition, using his/her registration ID number, the user may thus be registered and associated with his/her app ID. A manual input of user data, such as a name or email address, may thus be omitted. The confirmation 440 may also be carried out on another device, for example, a stationary computer.

An additional step includes requesting 450 a TAN for the vehicle with an individual VIN. Alternatively, the VIN may be manually entered into the app, and the TAN may thus be requested. The TAN may be depicted in the vehicle as a QR code (cf. FIG. 2) and recorded by the app using the app ID. The TAN and app ID may be sent to the computer with the aid of the app. As a result, an association of the vehicle with the app ID and thus with the user may be made possible. A graphical display device in the vehicle may thus also be omitted, and a depiction of the TAN may, for example, be carried out on a digital display.

Furthermore, the user may agree 460 to general terms and conditions, a data privacy statement, and optionally, a marketing declaration of agreement. Legal texts in this context may be sent to the user via email. As a result, a contract or registration process may be concluded for a user using an individual ID, and the user may be registered as the primary user of the vehicle using an individual VIN. Optionally, a verification 470 may be carried out via a contractual partner (for example, provider, dealer, etc.), in which the user presents documents (for example, a photo ID, vehicle documents), and the contractual partner is able to confirm the user information (ID, name, address, VIN) in a service portlet. In other words, an association between the user and the vehicle may thus be verified.

Some of the aforementioned exemplary embodiments may include a mobile device, for example, a smartphone including a camera, an Internet connection, or email access. Via exemplary embodiments, a registration may be carried out in the vehicle and may become active more rapidly in comparison to conventional methods, or even immediately. A manual input of links, addresses, VIN, TAN, and a personal computer (PC) including a portal for registration may be omitted under some circumstances. The verification may optionally be carried out on site by a contractual partner. Exemplary embodiments may provide a simplified option for linking primary user data, app data, and vehicle data to a database of the computer, or also for entering into a contract with the user.

Figure 4:
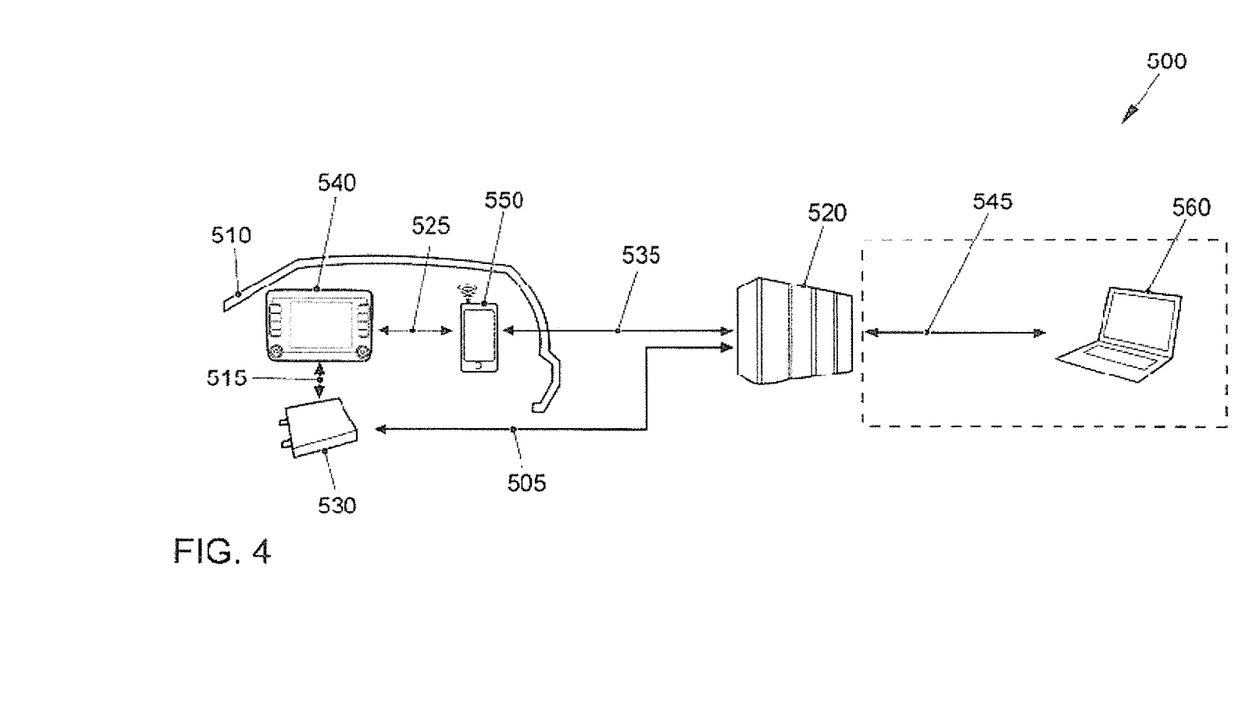
FIG. 4 shows a system including a motor vehicle and a computer according to at least one exemplary embodiment.

FIG. 4 shows a system 500 including a motor vehicle 510 and a computer 520 which, for example, is included in a data center. Some exemplary embodiments relate to the motor vehicle 510. The motor vehicle 510 includes an onboard device 530, for example, an internal control unit. The onboard device 530 is designed to send a request signal for an authentication code to the computer 520 and to receive the authentication code from the computer 520. This may take place via a first connection 505, which may be a mobile radio or Internet connection, and which may also be encrypted.

Some exemplary embodiments also relate to the system 500. The system 500 includes the motor vehicle 510 and the computer 520. The computer 520 is designed to receive the request signal for the authentication code. The request signal also includes a piece of information about the identity of the motor vehicle 510. In addition, the computer 520 is designed to provide the authentication code to the onboard device 530 of the motor vehicle 510 in response to the request signal. The onboard device may transfer a signal for displaying the authentication code on a display device 540 in the vehicle 510 via an in-vehicle connection 515, for example, a Bedien-und Anzeigeprotokoll (BAP; a proprietary protocol used by Volkswagen AG of Wolfsburg, Lower Saxony, Germany) or Controller Area Network (CAN) bus.

The request signal may have been previously carried out via a mobile device 550 of the user via a wireless connection 525, which may also be encrypted. The mobile device 550 may, for example, be a mobile telephone or tablet, and may include an app for supporting communication inside a vehicle network. The mobile device 525 has an app ID which is transmitted to the computer 520 together with a YIN of the vehicle 510 during the sending of the request signal.

Furthermore, the mobile device 550 may include an optical sensor or a camera, with the aid of which the authentication code is recorded from the display device 540, and is transferred from the mobile device 550 to the computer 520 via a second connection 535. The second connection 535 may be a cell phone or Internet connection, and may also be encrypted.

Optionally, a request of the authentication code may be carried out via a personal computer 560 (PC) which has an Internet connection 545 and enables an access to the portal of the computer 520. However, in some exemplary embodiments, this may be omitted.

Figure 5:
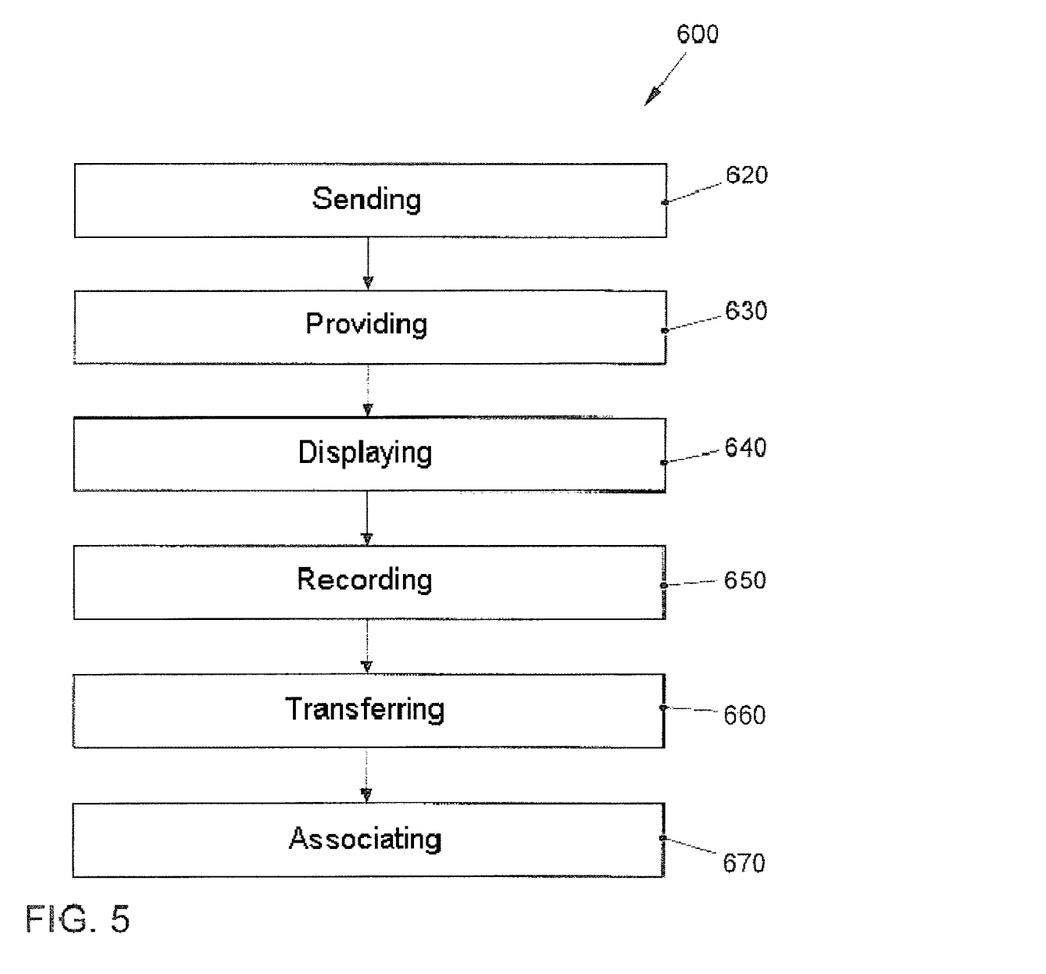
FIG. 5 shows a flow chart of a method for authenticating an authorization of a user of a motor vehicle according to an additional exemplary embodiment.

FIG. 5 shows a flow diagram of a method 600 for associating an identity of a user with an identity of a motor vehicle. The method 600 may be applied with the aid of the system 500 shown in FIG. 4 including a motor vehicle 510, computer 520, and mobile device 550. The method 600 includes sending 620 a request signal for an authorization code to a computer. In this case, the request signal also includes a piece of information about an identity of the motor vehicle. The method 600 also includes providing 630 the authorization code via the computer to an onboard device included in the motor vehicle. In addition, the method 600 includes displaying 640 the authorization code as a two-dimensional matrix code via a display device included in the onboard device. The method 600 furthermore includes recording 650 the authorization code from a display device via a mobile device. Furthermore, the method 600 includes transferring 660 the authorization code and a piece of identification information to the computer via the mobile device. In addition, the method 600 includes associating 670 the authorization code and the piece of information about the identity of the motor vehicle with an identity of the user which was previously stored by the computer, based on the piece of identification information. The method 600 may enable an identification of a primary user of a vehicle with the aid of an app running on the mobile device. The method 600 may also be used for a simplified registration of a user for a motor vehicle. Furthermore, the method 600 may enable an optical exchange of data.

In some exemplary embodiments of the method 600, a link to the app may exist as a QR code in a log book or a brochure. This may make it possible for a search for the app in an app store to be omitted. Furthermore, a vCard of the user may be recordable as a QR code, and the manual input of the customer data (name, address, email) may thus be omitted. By requesting the TAN from the vehicle with the VIN, an input of the VIN may possibly be omitted. By recording the TAN in the vehicle as a QR code, an input of a security code or a separate linking of the app to additional codes may possibly be omitted. In other exemplary embodiments, an input of a password or responses to identity questions for the user may take place manually in the app. Furthermore, an input of the TAN for associating the app with the user may be omitted, and the association may be established automatically.

Exemplary embodiments may enable a display of an information technology key (TAN) in optical form (for example, QR code), and optionally recording of the same via a mobile device, for example, a smartphone including a camera. It may thus no longer be necessary for the user to read, write down, and re-enter the code. Likewise, manual handling of additional codes for associating the app may be omitted. This may directly affect a result; in other words, under some circumstances, a waiting time may thus be reduced by an omission of transmission times or transfers. Logistics of physical components may also be omitted. Furthermore, vulnerability to errors or a number of components used for carrying out at least one of the methods may possibly be reduced.

Exemplary embodiments may be used in such motor vehicles, in which mobile online services are provided. The motor vehicles include a graphical display area, for example, as part of a radio, a navigation device, or a combination instrument including a multifunction display screen.

The features disclosed in the above description, the following claims, and the attached figures may be relevant and may be implemented in their various embodiments both individually as well as in any arbitrary combination for carrying out an exemplary embodiment.

Although some features have been described with respect to a device, it is to be understood that these features also constitute a description of the corresponding method, so that a block or a structural component of a device may also be understood to be a corresponding method step or a feature of a method step. Similarly, features which have been described with respect to at least one method step or as a method step also represent a description of a corresponding block or detail or feature of a corresponding device.

Depending on particular implementation requirements, exemplary embodiments may be implemented in hardware or in software. The implementation may be carried out using a digital storage medium, for example, a floppy disk, a DVD, a Blu-Ray disc, a CD, a ROM, a PROM, an EPROM, an EEPROM, or a FLASH memory, a hard disk, or another magnetic or optical memory on which electronically readable control signals are stored, which are able to interact or which interact with programmable hardware components in such a way that the particular method is carried out.

A programmable hardware component may be formed via a processor, a central processing unit (CPU), a graphics processing unit (GPU), a computer, a computer system, an application-specific integrated circuit (ASIC), an integrated circuit (IC), a system on chip (SOC), a programmable logic element, or a field-programmable gate array (FPGA) including a microprocessor.

The digital storage medium may therefore be machine-readable or computer-readable. Some exemplary embodiments thus include a data carrier which has electronically readable control signals which are capable of interacting with a programmable computer system or a programmable hardware component in such a way that at least one of the methods described herein is carried out. At least one exemplary embodiment is thus a data carrier (or a digital storage medium or a computer-readable medium) on which the program is stored for carrying out at least one of the methods described herein.

Generally, exemplary embodiments may be implemented as a program, firmware, a computer program, or a computer program product including program code, or as data, in which the program code or the data is/are effective for carrying out at least one of the methods if the program runs on a processor or a programmable hardware component. The program code or the data may, for example, also be stored on a machine-readable carrier or data carrier. Among other things, the program code or the data may exist as source code, machine code, or byte code, as well as other intermediate code.

Furthermore, at least at least one additional exemplary embodiment is a data stream, a signal sequence, or a sequence of signals which constitute(s) the program for carrying out at least one of the methods described herein. The data stream, the signal sequence, or the sequence of signals may, for example, be configured to be transferred via a data communication connection, for example, via the Internet or another network. Exemplary embodiments are thus also signal sequences representing data, which are suitable for transmission via a network or a data communication connection, in which the data constitute the program.

At least one program according to at least one exemplary embodiment may implement at least one of the methods during its execution, for example, by reading out these storage areas or writing a piece of data or multiple pieces of data into them, whereby switching operations or other operations are possibly generated in transistor structures, in amplifier structures, or in other electrical, optical, or magnetic components, or components operating according to another functional principle. Accordingly, data, values, sensor values, or other information may be recorded, determined, or measured by a program via reading out a storage area. A program may therefore record, determine, or measure variables, values, measured variables, and other information by reading out one or multiple memory areas, and effectuate, induce, or carry out an action by writing into one or multiple storage areas, and control other devices, machines, and components.

The above-described exemplary embodiments constitute merely an illustration of the principles disclosed. It is to be understood that modifications and variations of the arrangements and details described herein will be clear to others skilled in the art. Therefore, it is intended that the present disclosure is to be limited only by the scope of protection of the patent claims below, not by the specific details which have been presented herein based on the description and the explanation of the exemplary embodiments.

LIST OF REFERENCE NUMERALS

100 Method
110 Receiving
120 Sending
130 Providing
140 Displaying
150 Recording
160 Transferring
310-1; 310-2 Matrix code
320 Driver assistance system
330 Additional operating elements
340 Dashboard
350 Additional instruments
410 Installation
420 Creation
430 Setting
440 Confirmation
450 Requesting
460 Agreement
470 Verification
500 System
505 First connection
510 Motor vehicle
515 In-vehicle connection
520 Computer
525 Wireless connection
530 Onboard device
535 Second connection
540 Display device
545 Internet connection
550 Mobile device
560 Personal computer
600 Method
620 Sending
630 Providing
640 Displaying
650 Recording
660 Transferring
670 Associating

The invention claimed is:

1. A method for authenticating an authorization of a user of a motor vehicle to access motor vehicle information, the method comprising:

sending a request signal from the motor vehicle or a mobile device associated with the user to a computer remote from the motor vehicle and the mobile device, the request signal including a piece of information about an identity of the motor vehicle and indicating a request for an authentication code;

responsive to the request, providing the authentication code by the computer to an onboard device included in the motor vehicle;

displaying, on a display device of the motor vehicle, the authentication code provided by the computer, wherein the display device is linked to the onboard device;

recording from the display device, via the mobile device of the user, the authentication code provided by the computer;

transferring the recorded authentication code from the mobile device of the user to the computer remote from the motor vehicle; and responsive to transfer of the recorded authentication code from the mobile device to the computer remote from the motor vehicle, generating an association between the identity of the motor vehicle and the user's identity based on the authentication code and the piece of information about the identity of the motor vehicle as part of authenticating an authorization of the user to access motor vehicle information.

2. The method of claim 1, wherein the sending of the request signal is carried out on a wireless communication channel.

3. The method of claim 1, wherein the sending of the request signal is carried out via the onboard device included in the motor vehicle.

4. The method of claim 3, further comprising receiving a trigger signal via the onboard device, wherein the sending of the request signal is carried out in response to the trigger signal.

5. The method of claim 1, wherein displaying includes displaying the authentication code as a two-dimensional matrix code via the display device.

6. The method of claim 1, wherein the request signal is transmitted from the mobile device.

7. The method of claim 1, further comprising verifying the association between the identity of the motor vehicle and the identity of the user.

8. A method for associating an identity of a user with an identity of a motor vehicle as part of authenticating an authorization of the user to access motor vehicle information, the method comprising:
sending a request signal for an authentication code to a computer that is remote from the motor vehicle, wherein the request signal also includes a piece of information about an identity of the motor vehicle;
providing the authentication code by the computer to an onboard device included in the motor vehicle;
displaying the authentication code provided by the computer as a two-dimensional matrix code on a display device included in the onboard device of the motor vehicle;
recording from the display device, via a mobile device associated with the user, the authentication code provided by the computer;
transferring, via the mobile device, the recorded authentication code and the piece of information about the identity of the motor vehicle to the computer; and
responsive to transfer of the recorded authentication code and the piece of information about the identity of the motor vehicle to the computer, generating an association, by the computer, between the identity of the motor vehicle and an identity of the user previously stored by the computer based on the authentication code and the piece of information about the identity of the motor vehicle as part of authenticating an authorization of the user to access motor vehicle information.

9. The method of claim 8, further comprising verifying the association between the identity of the motor vehicle and the identity of the user.

10. A system comprising:
a motor vehicle that includes an onboard device configured to send a request signal for an authentication code and to receive the authentication code, wherein the request signal includes a piece of information about an identity of the motor vehicle; and
a remote computer configured to receive the request signal from the onboard device of the motor vehicle and to provide the authentication code to the onboard device of the motor vehicle in response to the request signal,
wherein the onboard device is linked with a motor vehicle display device, and the motor vehicle display device is configured to display the computer-provided authentication code for recording by a mobile device associated with a user,
wherein the remote computer is configured to receive the recorded authentication code from the mobile device and, in response to receipt of the recorded authentication code from the mobile device, to generate an association between the identity of the motor vehicle and an identity of the user of the mobile device based on the recorded authentication code and the piece of information about the identity of the motor vehicle.

11. The system of claim 10, wherein the onboard device is configured to send the request signal on a wireless communication channel.

12. The method of claim 10, wherein the onboard device is configured to send the request signal in response to a trigger signal.

13. The system of claim 10, wherein the remote computer is further configured to verify the association between the identity of the motor vehicle and the identity of the user.

14. A non-transitory computer readable medium comprising a program including program code for execution by a processor for:
sending a request signal for an authentication code to a computer that is remote from a motor vehicle and a mobile device associated with a user, wherein the request signal includes a piece of information about an identity of the motor vehicle, wherein the request signal includes a request to provide the authentication code to an onboard device of the motor vehicle for display on a display device of the motor vehicle for recording via a mobile device,
wherein a recording of the authentication code thereafter transferred to the remote computer responsively causes generation of an association between an identity of the user and the identity of the motor vehicle based on the recorded authentication code and the piece of information about the identity of the motor vehicle as part of authenticating an authorization of the user to access motor vehicle information.

15. The non-transitory computer readable medium of claim 14, further comprising program code for execution by the processor for verifying the association between the identity of the motor vehicle and the identity of the user.

* * * * *